United States Patent [19]
Gabas

[11] Patent Number: 5,542,453
[45] Date of Patent: Aug. 6, 1996

[54] PRESSURIZED HYDRAULIC PISTON-CYLINDER DEVICE WITH INTERNAL VOLUME VARIATION COMPENSATION

[75] Inventor: Carlos Gabas, Barcelona, Spain

[73] Assignee: Fico Cables, S.A., Barcelona, Spain

[21] Appl. No.: 244,009

[22] PCT Filed: Sep. 15, 1993

[86] PCT No.: PCT/ES93/00075

§ 371 Date: Jun. 23, 1994

§ 102(e) Date: Jun. 23, 1994

[87] PCT Pub. No.: WO94/08152

PCT Pub. Date: Apr. 14, 1994

[30] Foreign Application Priority Data

Oct. 2, 1992 [ES] Spain ................................ 9201948

[51] Int. Cl.⁶ ........................................ F16D 13/75
[52] U.S. Cl. ........................ 138/30; 138/31; 220/721
[58] Field of Search .................... 138/30, 26, 44, 138/89, 31; 220/721; 215/349, 351; 192/111 A

[56] References Cited

U.S. PATENT DOCUMENTS

| | | | |
|---|---|---|---|
| 3,489,307 | 1/1970 | Wenger | 215/351 X |
| 4,328,836 | 5/1982 | Petrie | 138/30 |
| 4,335,751 | 6/1982 | Sugimura et al. | 138/30 |
| 4,640,428 | 2/1987 | Chang | 215/351 X |
| 4,793,381 | 12/1988 | Sugimura | 138/30 |
| 4,996,963 | 3/1991 | Fehrenbach et al. | 138/30 X |
| 5,062,455 | 11/1991 | Schurter et al. | 138/30 |
| 5,094,433 | 3/1992 | Dan et al. | 138/30 X |
| 5,117,873 | 6/1992 | Miyakawa et al. | 138/30 |
| 5,265,710 | 11/1993 | Gabas et al. | 192/111 A |
| 5,265,747 | 11/1993 | Gregory et al. | 215/349 |

FOREIGN PATENT DOCUMENTS

| | | |
|---|---|---|
| 2055597 | 4/1977 | France . |
| 9002014 | 7/1990 | Spain . |
| 368823 | 3/1932 | United Kingdom . |

OTHER PUBLICATIONS

UK Patent Application #2,152,606A Kamemoto et al. Dec. 1984.
European Application #214,000 Hauguel Jul. 1986.

Primary Examiner—David Scherbel
Assistant Examiner—Patrick F. Brinson
Attorney, Agent, or Firm—Michael J. Striker

[57] ABSTRACT

The pressurized hydraulic piston-cylinder device with an internal volume variation compensation device includes a hydraulic pressure cylinder; a piston movable in the pressure cylinder; a cap closing the functional end of the pressure cylinder; and a liquid contained in the hydraulic pressure cylinder between the cap and the movable piston. The cap includes a substantially cylindrical hollow body member which fits snugly fits over the functional end of the pressure cylinder and an end wall at another end opposite from the open end, and a resilient compensating diaphragm having an outer surface facing the pressure cylinder and an inner surface facing the end wall of the hollow body member. The resilient compensating diaphragm and the end wall bound a compensating chamber having a variable volume depending on a pressure of the liquid contained in the hydraulic pressure cylinder and acting on the outer surface of the resilient compensating diaphragm.

8 Claims, 3 Drawing Sheets

PRESSURIZED HYDRAULIC PISTON-CYLINDER DEVICE WITH INTERNAL VOLUME VARIATION COMPENSATION

BACKGROUND OF THE INVENTION

The present invention relates to a pressurized hydraulic piston-cylinder device with means for compensating internal volume variations and, more particularly, to a cap of a pressure cylinder of a pressurized hydraulic piston-cylinder device having a volumetric compensating device.

This invention has been developed within a research program of wider general scope relating to the manufacture of hydraulic self-regulating devices for regulating, by way of permanent adjustment, the length of the cable, or linking member, connecting a mechanism with the corresponding control member. An example of such self-regulating devices are the devices for regulating the length of the control cable linking the clutch mechanism with the clutch pedal. The purpose of this regulation of the control cable length is to compensate for the wear of the clutch plate lining during use.

A known hydraulic self-regulating device for the clutch control cable length is disclosed in Spanish patent P 9002014. It describes a device which comprises a main body member, or cylinder, housing therein a piston which comprises a check valve, a regulating rod which is connected at one end thereof to the piston and at the other end, which extends out from the main body member, it is connected to the control cable linking it with the clutch pedal and a liquid completely filling the interior space of the cylinder. Among its many possible applications, the device according to Spanish patent P 9002014 has proved to be highly efficient when used in the regulation of the length of the control cable extending from the clutch pedal to the pressure plate fork of the clutch mechanism. This regulation occurs by automatically varying the length of the portion of the regulating rod housed within the cylinder appropriately to compensate for the wear of the clutch. In other words, the length of the outwardly extending portion of the rod increases, which is equivalent to increasing the operative length of the control cable, whenever there is a physically noticeable wear so that the length of the cable increases, adjusting itself to the new situation arising from such wear.

The self-regulating device according to Spanish patent P 9002014 is provided with volumetric compensation means designed permanently and automatically to absorb the variations of volume affecting both the cylinder and the liquid contained therein owing to changes in the ambient temperature of the place where the device is installed. The compensation means are also designed to absorb the variations of volume caused inside the cylinder by the variations of the length of the rod portion contained in the cylinder.

Hereinafter, with a view to achieving adequate clarity of disclosure in the description, the useful internal volume of the cylinder is defined to be the same as the volume occupied by liquid plus the volume occupied by the volumetric compensation means housed in the cylinder, as measured under the original manufacturing conditions, i.e. with the piston, other mechanical members and a particular portion of the rod housed in the cylinder, at the temperature of manufacture.

In the hydraulic self-regulating devices such as the one described above, the useful internal volume of the cylinder does not remain constant, but quite otherwise. The useful internal volume varies, basically, depending on the variation of the rod portion contained in the cylinder and depending on the variation of the operating temperature of the cylinder. In the former case, an increase of the length of the rod portion contained in the cylinder, caused when the piston moves inwardly, implies a reduction of the useful internal volume while, on the contrary, a shortening of the length of the rod portion contained in the cylinder, caused when the piston moves outwardly, implies an increase in the useful internal volume. In the latter case, an increase of the cylinder operating temperature causes the cylinder and the liquid contained therein to expand, increasing the useful internal volume while, on the contrary, a drop in the operating temperature causes the cylinder and the liquid contained therein to contract, reducing the useful internal volume. In this respect, it should be noted that the coefficients of expansion of the cylinder and of the liquid are substantially different, with the coefficient of expansion of the liquid being notably higher than that of the cylinder so that an increase of the cylinder temperature will cause an increase of the liquid pressure against the inner surface of the cylinder and on the volumetric compensation means. On the contrary, a lowering of the cylinder temperature will cause a lowering of the liquid pressure against the inner surface of the cylinder and on the volumetric compensation means.

It will be gathered from the above that the volumetric compensation means included in the hydraulic self-regulating devices as described above absorb the variations of volume and, consequently, the variations in the pressure exerted by the liquid on the inside of the cylinder which affect both the cylinder and the liquid contained therein while the device is operating or even during the storage of the device prior to its assembly. In fact, at a constant temperature, a shortening of the length of the rod portion housed in the cylinder generates a depression causing a corresponding increase in the volume occupied by the volumetric compensation means, i.e., there is an increase in the useful internal volume while, on the contrary, an increase of the length of the rod portion causes a corresponding reduction of the volume occupied by the volumetric compensation means, i.e. there is a reduction of the useful internal volume. And, for a given position of the piston in the cylinder, i.e. for a given length of the rod portion housed in the cylinder, an increase of the cylinder temperature causes an expansion of the liquid greater than the expansion of the cylinder, which generates a pressure causing in turn a corresponding reduction of the volume occupied by the volumetric compensation means while, on the contrary, a lowering of the cylinder temperature causes a contraction of the liquid also greater than the contraction of the cylinder which, in turn, causes a corresponding increase in the volume occupied by the volumetric compensation means. Simultaneous changes of the length of the rod portion contained in the cylinder and of the cylinder temperature have a corresponding result, depression or pressure, which acts on the volumetric compensation means, increasing or reducing the compensation volume, as described above.

SUMMARY OF THE INVENTION

The objective of the pressurized hydraulic piston-cylinder device for compensating internal volume variations of the invention is precisely to compensate volumetric variations occuring during the operation of pressurized hydraulic cylinders such as the one described above.

It will, consequently, be understood that the cap with volumetric compensation device of the invention may be used in any cylinder working under pressure, where it is desired automatically to correct both the volumetric variations of the cylinder inner space due to its very functioning and those volumetric variations due to changes in the cylinder temperature.

The volumetric compensation device of the invention is distinguished from other known compensating devices by its structure and by the way it performs.

With a view to providing a new embodiment of volumetric compensating device, applicable to a wide range of pressurized hydraulic cylinders, there is disclosed a cap with volumetric compensating device for pressurized hydraulic cylinders.

The cap of the invention has been tested with very good results in the cylinders of hydraulic self-regulating devices used in the automobile industry.

According to a first embodiment, the cap of the invention is characterized in that it comprises an essentially cylindrical hollow body member and a resilient compensating diaphragm, in which the hollow body member is relatively short and is provided at one end thereof with an open end dimensioned snugly to receive the corresponding functional end of a hydraulic pressure cylinder and connecting means allowing firm engagement of the hollow body member and cylinder and at the other end thereof with an end wall, the hollow body member having means for retaining the resilient compensating diaphragm and means for sealing the engagement between the hollow body member and the cylinder end.

The resilient compensating diaphragm is made from highly resilient material and the outer surface thereof, facing the cylinder, is convex and the inner surface, facing the hollow body member end wall, concave. The peripheral edge of the diaphragm is formed with a retaining extension which is coaxial with the longitudinal axis, or axis of revolution, of the diaphragm.

The arrangement being such that when the corresponding functional end of the cylinder is engaged with the hollow body member, the resilient compensating diaphragm bounds, between it and the hollow body member end wall, a variable volume compensating chamber, the volume variation of which depends on the pressure of the liquid contained in the cylinder and acting on the outer surface of the diaphragm.

According to a further embodiment of the cap of the invention, it is provided with an additional feature. In accordance with this further constructional feature, the cap of the invention comprises the above described operative elements but there is housed in the compensation chamber a compensating coil spring which is permanently under compression, with one end bearing against the inner concave surface of the resilient compensating diaphragm and the other end thereof bearing against the inner surface of the hollow body member end wall. The inner concave surface and said inner surface of the end wall are provided with respective means for positionally retaining the compensating coil spring.

The compensating coil spring positioning means may comprise, on the inner concave surface of the compensating diaphragm, a relatively short axial cylindrical extension snugly housed in one of the ends of the compensating coil spring and on the inner surface of the hollow body member end wall a relatively shallow recess in which the other end of the compensating coil spring is housed.

In both of the above described embodiments of the cap of the invention, the means for retaining the resilient compensating diaphragm and for sealing the engagement of the hydraulic cylinder with the hollow body member comprise, on the inner surface of the hollow body end wall, a coaxial slot of basically U-shaped section, dimensioned snugly to receive the corresponding portion of the resilient compensating diaphragm retaining extension, so that the retaining extension is compressively held between the cylinder and the hollow body member.

Also in both above described embodiments of the cap of the invention, whenever required, the inner surface of the hollow body member end wall is provided with an axial concavity dimensioned to house the resilient compensating diaphragm.

The operation of the cap with a volumetric compensating device of the invention, the features of which have been described above, is extremely simple and efficient and in no way alters the operation of the hydraulic cylinder on which it is mounted. In fact, once the hydraulic cylinder and the cap of the invention have been suitably coupled together, there is established an initial state, predetermined by the manufacturer, in which there is set the useful internal volume which, as defined above, is the volume occupied by the liquid plus the volume occupied by the volumetric compensating means. With regard to the volume occupied by the compensating chamber, it is thus understood to be the volume corresponding to the space defined by the resilient compensating diaphragm and by the hollow body member end wall of the cap of the invention. When, as a result of the operation of the cylinder and/or by a variation of the temperature of the latter, it is required to compensate for an increase of the useful internal volume of the cylinder by causing it to be reduced, the resilient compensating diaphragm, pressed on the outside by the liquid, is resiliently deformed so that the volume of the compensating chamber is progressively reduced until the pressures on the inner and outer sides of the compensating diaphragm become equalled. On the contrary, when it is required to compensate for a reduction of the useful internal volume of the cylinder by causing it to increase, the resilient compensating diaphragm is resiliently deformed so that the volume of the compensating chamber increases until once again the pressures on both sides of the compensating diaphragm are equal.

The operation of the cap of the invention is essentially the same in either of the two possible constructional modes described above. In fact, in accordance with the first constructional mode of the cap of the invention, the cap comprises the hollow body member and the resilient compensating diaphragm. In this case, the pressure of the liquid on the outer surface of the diaphragm is offset by the resilient reaction of the diaphragm itself. In accordance with the second constructional mode of the cap of the invention, the cap comprises the hollow body member, the resilient compensating diaphragm and, furthermore, a compensating coil spring. In this second case, the pressure of the liquid on the outer surface of the diaphragm is offset by the resilient reaction of the diaphragm itself and, furthermore, by the resilient reaction of the spring which, as said above, is permanently under compression. Obviously, whether one or the other characteristic constructional mode of the cap of the invention is used will depend on the technological requirements of each particular application.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
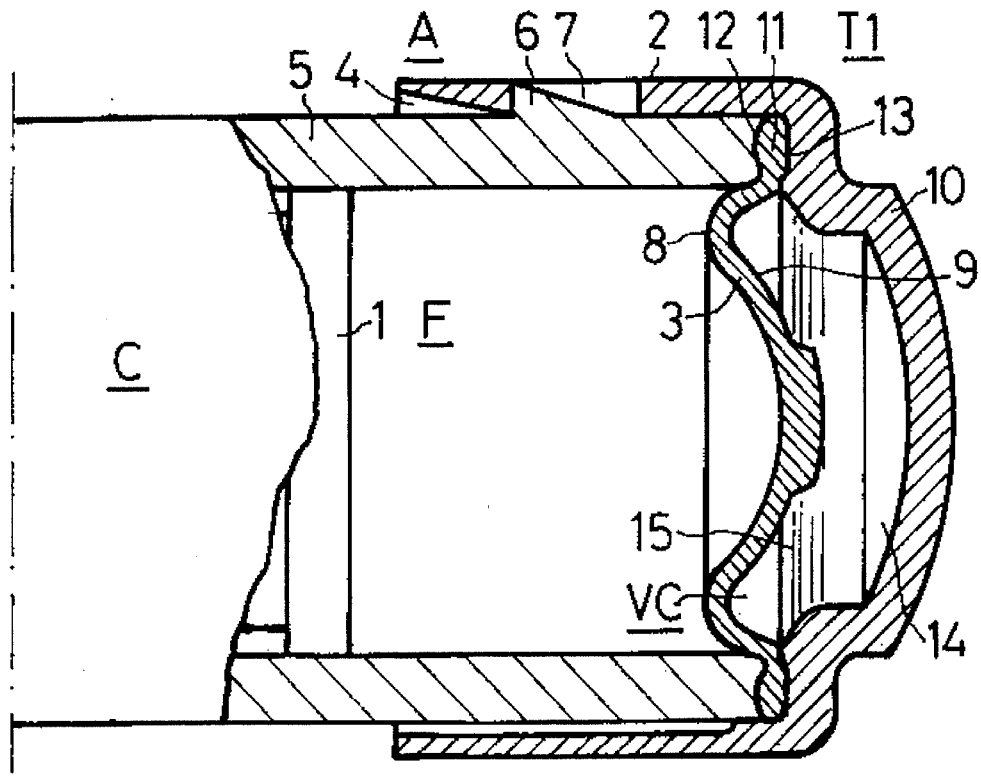
FIG. 1 is a cross section view showing one constructional mode T1 of the cap of the invention in which the compensating chamber occupies an intermediate volume.

For clarity of disclosure, the constituent members of the three examples drawn of the cap of the invention which are mutually equivalent shall have the same reference symbols in both the description and in the drawing figures.

In the drawing figures, both constructional modes T1 (FIGS. 1 and 2) and T2 (FIGS. 3 to 5) of the cap of the invention are attached to a hydraulic cylinder C, which for the same reasons as given above, has been shown only in part. The hydraulic pressure cylinder C can form part of any type of device, machine or apparatus such as, for example, the devices for permanently regulating the length of the control cable linking the clutch mechanism with the corresponding pedal. It is in the hydraulic pressure cylinder C where the variations of the internal volume thereof caused by movements of the piston 1 as a result of the larger or smaller portion of the operating rod (not shown in the drawings) housed in the inside of the cylinder C have to be permanently and automatically compensated and the expansion of the cylinder C itself and of the liquid F contained therein caused by variations in the temperature of the environment in which the cylinder is working has also to be compensated.

Figure 2:
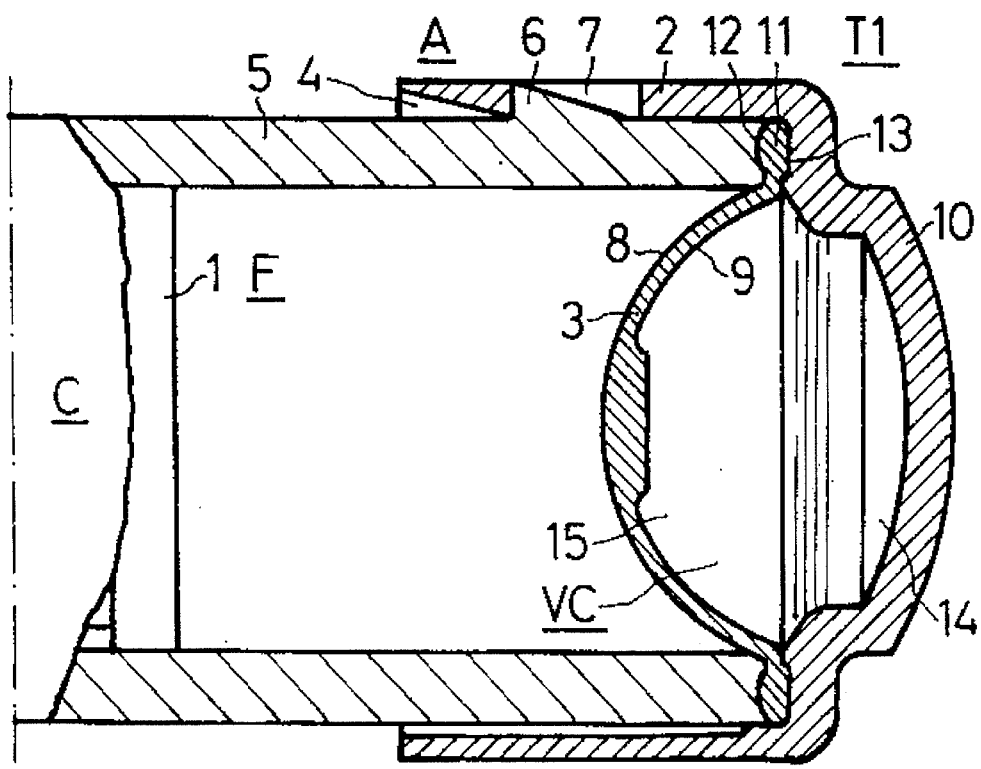
FIG. 2 is a cross section view of the constructional mode T1 of the cap of the invention in which, in comparison with FIG. 1, the compensating chamber occupies a larger volume.

The embodiment corresponding to the constructional mode T1 of the cap of the invention is shown in FIGS. 1 and 2. The cap comprises the hollow body member 2 and the resilient compensating diaphragm 3.

The hollow body member 2 is essentially elongate and cylindrical and at the front end A thereof there is the open end 4 snugly receiving the functional end 5 of the hydraulic pressure cylinder C. The firm attachment of the functional end 5 of the hydraulic pressure cylinder C to the hollow body member 2 is achieved by mutual coupling means. The coupling means comprising a plurality of equidistantly spaced apart perimetral retaining projections 6 on the end 5 of the hydraulic pressure cylinder C and retaining grooves 7 on the hollow body member 2. There is the same number of retaining grooves 7 as retaining projections 6 and they are dimensioned such that the projections 6 are housed snugly therein.

The resilient compensating diaphragm 3 is provided with an outer surface 8 and an inner surface 9. The outer surface 8 faces the piston 1 of the C and the inner surface 9 faces the end wall 10 of the hollow body member 2, the peripheral edge of the diaphragm 3 being provided with the retaining extension 11 which is coaxial with the axis of revolution of the diaphragm 3.

The means for retaining the resilient compensating diaphragm 3 and at the same time for sealing the connection between the hollow body member 2 and the end 5 of the C are formed by the curved section recess 12 provided all around the front surface of the end 5 of the C and by the coaxial U-shaped groove 13 provided on the inner surface of the end wall 10 of the hollow body member 2.

The recess 12 and the coaxial groove 13 of the cylinder C and of the hollow body member 2, respectively, are dimensioned to mate with the retaining extension 11 of the resilient compensating diaphragm 3. In this way, the connection of the end 5 of the cylinder C to the hollow body member 2 of the cap of the invention, by way of the retaining projections 6 and slots 7 with which they are respectively provided, compresses the retaining extension 11 of the resilient compensating diaphragm 3, thereby preventing leaks of the liquid F to the outside.

In this embodiment of the constructional mode T1 of the cap of the invention, the end wall 10 of the hollow body member 2 is provided internally with the concavity 14 which, as shown in FIG. 1, is for housing the resilient compensating diaphragm 3.

The resilient compensating diaphragm 3 and the hollow body member 2 bound the compensating chamber 15 which, in this embodiment, is bounded by the inner surface 9 of the resilient compensating diaphragm 3 and the end wall 10 of the hollow body member 2. The compensating chamber 15 has a volume VC which, when the cylinder C is operating, may vary, having different values.

Figure 3:
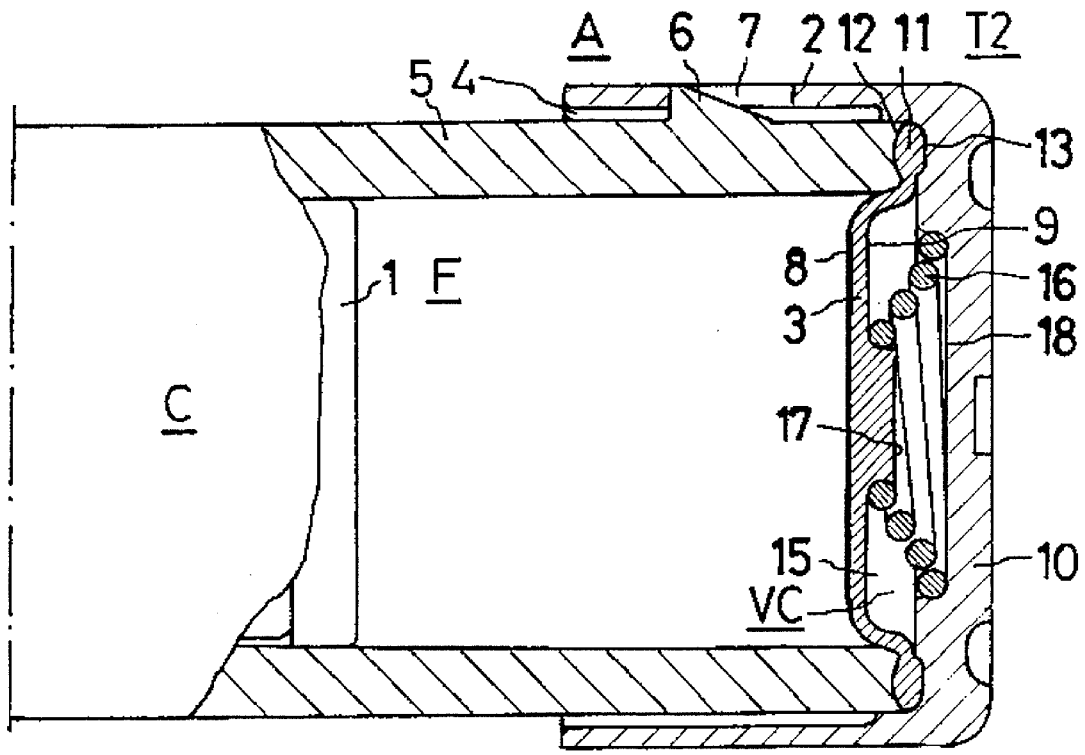
FIG. 3 is a cross section view of a second constructional mode T2 of the cap of the invention in which the compensating chamber occupies an intermediate volume.
Figure 4:
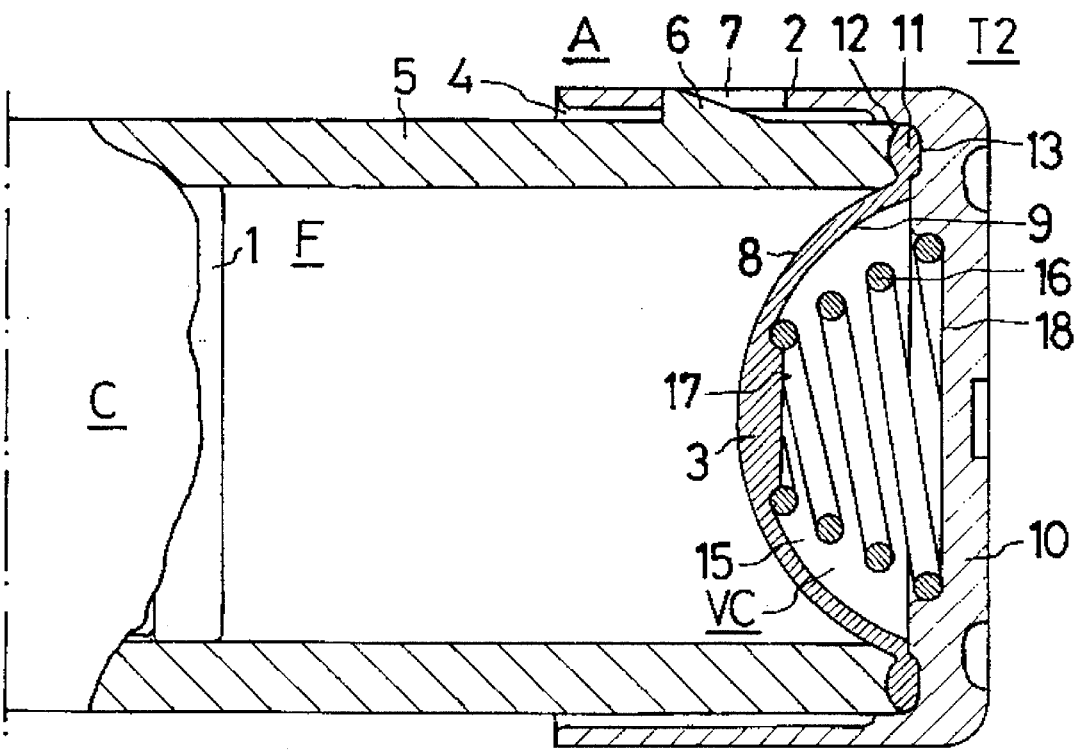
FIG. 4 is a cross section view of the constructional mode T2 of the cap of the invention in which, in comparison with FIG. 3, the compensating chamber occupies a larger volume.

FIGS. 3 and 4 show the embodiment of the constructional mode T2 of the cap of the invention. It comprises the hollow body member 2 and the resilient compensating diaphragm 3 as in the constructional mode T1 and, furthermore, the compensating coil spring 16 which is housed in the compensating chamber 15.

The presence of the compensating coil spring 16 in the constructional mode T2 allows the internal concavity 14, which is more desirable for the above described constructional mode T1, to be dispensed with. Therefore, the embodiments of FIGS. 3 and 4 have been drawn without the internal concavity 14. In the embodiments of FIGS. 3 and 4, there is drawn the central recess 18, to be explained hereinafter, situated approximately in the same place as the internal concavity 14.

The compensating coil spring 16 is permanently under compression and bears at one end on the inner surface 9 of the resilient compensating diaphragm 3 and at the other end thereof on end wall 10 of the hollow body member 2. The positioning means for the spring 16 comprise the cylindrical axial extension 17 on the inner surface 9 of the diaphragm 3 and the central recess 18 on the inner surface of the end wall 10 of the hollow body member 2.

Figure 5:
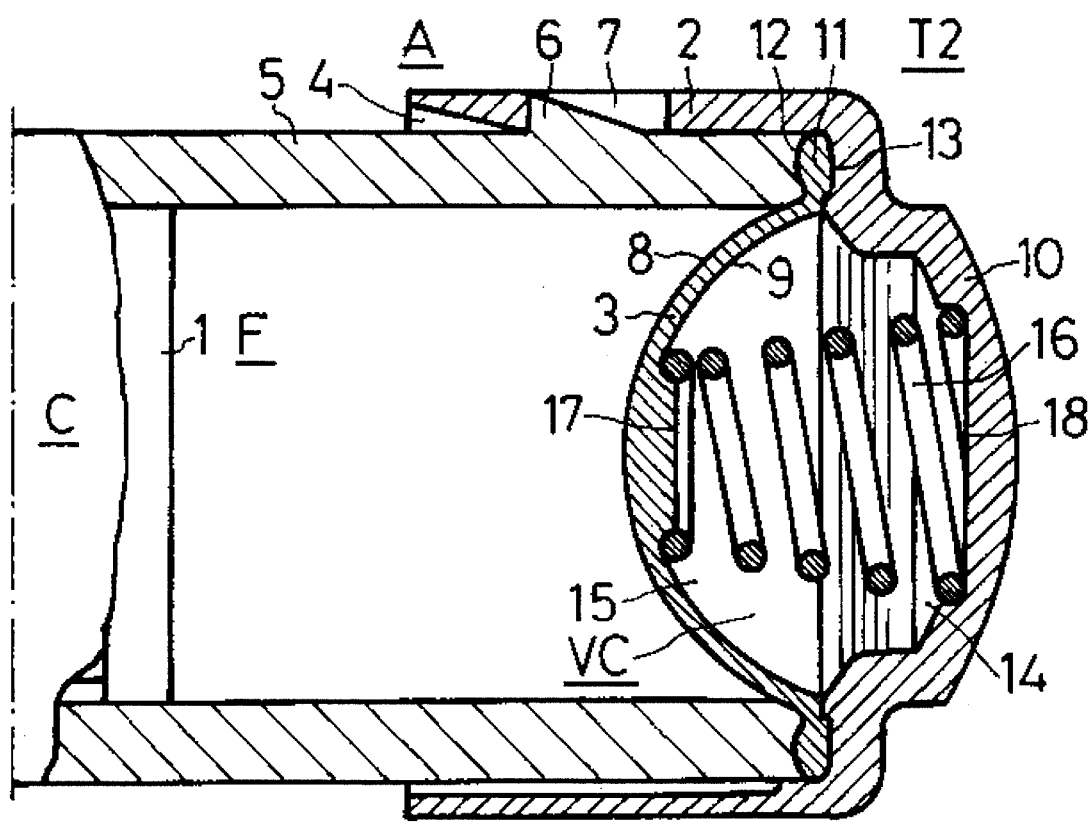
FIG. 5 is a cross section view also showing a further embodiment of the constructional mode T2 of the cap.

The axial extension 17 is dimensioned so that it is snugly housed in the corresponding end of the compensating coil spring 16. On the other hand, the central recess 18 is dimensioned snugly to receive the other end of the spring 16. In this way, the axial extension 17 and the central recess 18 prevent the compensating coil spring 16 from coming out of its working position as a result of the operating conditions of the cap of the invention and of the cylinder C FIG. 5 shows a further embodiment of the constructional mode T2 of the cap of the invention. The embodiment of FIG. 5 comprises all the items described above for the embodiment T2 as well as the concavity 14 provided in the end wall 10 of the hollow body member 2 described for the constructional mode T1. It will be understood that the centering function of the central recess 18 (FIGS. 3 and 4) may be performed by the internal concavity 14. In this way, by comparing the constructional mode T1 shown in FIGS. 1 and 2 with the constructional mode T2 shown in the embodiment of FIG. 5, it is clearly seen that the characteristic difference of substance is to be found in the fact that the construction mode T2 (FIG. 5) is provided, further, with the compensating coil spring 16.

The fundamental operation of the embodiments of FIGS. 1 to 5 of the cap with volumetric compensating device for pressurized hydraulic cylinders of the invention is described below.

Originally, in the assembly formed by the cylinder C and the cap of the invention, there is established, as said before, an initial state in which there is determined a useful internal volume of the cylinder which is the volume occupied by the liquid F plus the volume VC of the compensating chamber 15. Hereinafter, the operation of the embodiments of the invention shown in FIGS. 1 to 5 is essentially the same. In fact, when it is for any reason required to reduce the useful internal volume of the cylinder C, i.e. when the pressure of the liquid F on the inner surface 8 of the resilient compensating diaphragm 3 increases, the latter is progressively resiliently deformed, as shown in FIG. 1, reducing the volume VC of the compensating chamber 15 until the pressure levels on the inner surface 8 and outer surface 9 of the diaphragm are balanced. On the contrary, when it for any reason required to increase the useful internal volume of the cylinder C, i.e. when the pressure of the liquid F on the outer surface 8 of the diaphragm 3 drops, the latter is progressively resiliently deformed, as shown in FIG. 2, increasing the volume VC of the compensating chamber 15 until once again the pressure on the outer surface 8 and inner surface 9 of the diaphragm 3 are balanced. In the operation of the constructional mode T1 shown in FIGS. 1 and 2, the pressure of the liquid F on the outer surface 8 of the diaphragm 3 is opposed by the resilient reaction of the diaphragm 3 itself. And, in the operation of the constructional mode T2 shown in FIGS. 3 to 5, the pressure exerted by the liquid F on the outer surface 8 of the diaphragm 3 is opposed by the resilient reaction of the diaphragm 3 itself and, furthermore, by the resilient reaction of the compensating coil spring 16 which, as stated above, is permanently under compression. It will be understood that the adoption of the constructional mode T1 or T2 of the cap of the invention will depend on the requirements of the cylinder C in each particular application.

It will be understood that each of the elements described above, or two or more together, may also find a useful application in other types of constructions differing from the types described above.

While the invention has been illustrated and described as embodied in a cap with volumetric compensating device for pressurized hydraulic cylinders, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A pressurized hydraulic piston-cylinder device, with internal volume variation compensation, said piston-cylinder device comprising a hydraulic pressure cylinder having a functional end; a piston movable in said hydraulic pressure cylinder; a cap closing said functional end of said hydraulic pressure cylinder and a liquid contained in said hydraulic pressure cylinder between said cap and said movable piston, wherein said cap includes a substantially cylindrical hollow body member having an open end dimensioned so that said hollow body member snugly fits over said functional end of said pressurized hydraulic cylinder and an end wall at another end of said hollow body member opposite from said open end; connecting means for firmly connecting said hollow body member to said hydraulic pressure cylinder; and a resilient compensating diaphragm having an outer surface facing said hydraulic pressure cylinder and an inner surface facing said end wall of said hollow body member, wherein said outer surface of the diaphragm facing said cylinder is convex while said inner surface of said diaphragm facing said hollow body member is concave in an initial state established on coupling the cylinder with the cap including the diaphragm, said resilient compensating diaphragm and said end wall of said hollow body member bound a compensating chamber having a variable volume depending on a pressure of said liquid contained in said hydraulic pressure cylinder and acting on said outer surface of said resilient compensating diaphragm, wherein said resilient compensating diaphragm has a peripheral edge and is provided with an axis of revolution and a retaining extension coaxial with said axis of revolution at said peripheral edge and said end wall of said hollow body member has an inner surface provided with a U-shaped coaxial slot dimensioned to snugly receive said retaining extension of said resilient compensating diaphragm, so that said retaining extension is compressedly held and seals a connection between said hydraulic pressure cylinder and said hollow body member.

2. The device as defined in claim 1, wherein said end wall of said hollow body member is provided with an internal concavity for receiving said resilient compensating diaphragm.

3. The device as defined in claim 1, further comprising a compensating coil spring having one end bearing on said inner surface of said resilient compensating diaphragm and another end bearing on an inner surface of said end wall of said hollow body member.

4. The device as defined in claim 3, wherein said inner surface of said compensating diaphragm is provided with an axial cylindrical extension formed so that one of said ends of said compensating coil spring is received on said axial cylindrical extension and said inner surface of said end wall is provided with a recess formed so that another of said ends of said compensating coil spring is snugly received in said recess so that said axial cylindrical extension and said recess provide positioning means for positioning said compensating coil spring.

5. A pressurized hydraulic piston-cylinder device with internal volume variation compensation, said piston-cylinder device comprising a hydraulic pressure cylinder having a functional end; a piston movable in said hydraulic pressure cylinder; a cap closing said functional end of said hydraulic pressure cylinder and a liquid contained in said hydraulic pressure cylinder between said cap and said movable piston, wherein said cap includes a substantially cylindrical hollow body member having an open end dimensioned so that said hollow body member snugly fits over said functional end of said pressurized hydraulic cylinder and an end wall at another end of said hollow body member opposite from said open end; connecting means for firmly connecting said hollow body member to said hydraulic pressure cylinder; and a resilient compensating diaphragm made of a resilient material and having an outer surface facing said hydraulic pressure cylinder and an inner surface facing said end wall of said hollow body member, wherein said resilient compensating diaphragm and said end wall of said hollow body member bound a compensating chamber having a variable volume depending on a pressure of said liquid contained in said hydraulic pressure cylinder and acting on said outer surface of said resilient compensating diaphragm and wherein said inner surface of the resilient compensating diaphragm is concave and said outer surface of the resilient compensating diaphragm is convex in an initial state established by coupling of the cap and resilient compensating diaphragm with the cylinder during assembly of the piston-cylinder device.

6. The device as defined in claim 5, wherein said hollow body member has means for retaining said resilient compensating diaphragm and means for sealing a connection between said hollow body member and said hydraulic pressure cylinder.

7. The device as defined in claim 5, wherein said resilient compensating diaphragm has a peripheral edge and is provided with an axis of revolution and a retaining extension coaxial with said axis of revolution at said peripheral edge.

8. The device as defined in claim 5, wherein said hollow body member has a longitudinal axis and said resilient compensating diaphragm has a peripheral edge and is provided with a retaining extension coaxial with said longitudinal axis of said hollow body member.

* * * * *